(12) United States Patent
Boyden

(10) Patent No.: US 7,716,603 B2
(45) Date of Patent: May 11, 2010

(54) ON SCREEN DISPLAY FOR ALPHA-NUMERIC INPUT

(75) Inventor: David Boyden, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 543 days.

(21) Appl. No.: 11/299,058

(22) Filed: Dec. 9, 2005

(65) Prior Publication Data

US 2007/0132887 A1 Jun. 14, 2007

(51) Int. Cl.
*G06F 3/048* (2006.01)

(52) U.S. Cl. ........................ 715/834; 715/810

(58) Field of Classification Search .............. 348/14.03, 348/114, E5.001, E5.102, E5.103; 715/718, 715/834
See application file for complete search history.

(56) References Cited

U.S. PATENT DOCUMENTS

| | | | |
|---|---|---|---|
| 5,532,753 A | 7/1996 | Buchner et al. | |
| 6,335,736 B1 | 1/2002 | Wagner | 345/716 |
| 6,356,258 B1 * | 3/2002 | Kato et al. | 345/168 |
| 6,359,636 B1 | 3/2002 | Schindler | 345/846 |
| 6,411,337 B2 | 6/2002 | Cove et al. | |
| 6,448,987 B1 * | 9/2002 | Easty et al. | 715/834 |
| 6,549,219 B2 * | 4/2003 | Selker | 715/834 |
| 6,600,496 B1 | 7/2003 | Wagner | 345/716 |
| 6,812,940 B2 * | 11/2004 | Arnold | 715/817 |
| 6,871,323 B2 | 3/2005 | Wagner | 715/716 |
| 6,925,611 B2 * | 8/2005 | SanGiovanni | 715/834 |
| 7,280,097 B2 * | 10/2007 | Chen et al. | 345/156 |
| 7,293,231 B1 * | 11/2007 | Gunn et al. | 345/179 |
| 2004/0070567 A1 * | 4/2004 | Longe et al. | 345/156 |
| 2005/0240879 A1 * | 10/2005 | Law et al. | 715/773 |

OTHER PUBLICATIONS

Dan Venolia, Forrest Neiberg, T-Cube: A Fast, Self-Disclosing Pen-Based Alphabet, Human Factors In Computing Systems, Apr. 24-28, 1994.*

Joseph Ting-Chun Lai, Yang Li, Richard Anderson, Donuts: A Chinese Input Technique Using Pressure Sensitve Makring Menus, ACM, Oct. 24, 2005, http://www.acm.org/uist/uist2005/program.html.*

* cited by examiner

*Primary Examiner*—Ting Lee
*Assistant Examiner*—Ashraf Zahr
(74) *Attorney, Agent, or Firm*—John L. Rogitz

(57) ABSTRACT

An alpha wheel display, which is an image of a series of segmented concentric rings the segments of which indicate letters, is presented on a TV as a graphical user interface (GUI) that can be operated by a remote control point-and-click device for data input, e.g., to input a search term to an electronic program guide (EPG).

13 Claims, 2 Drawing Sheets

Alpha Wheel

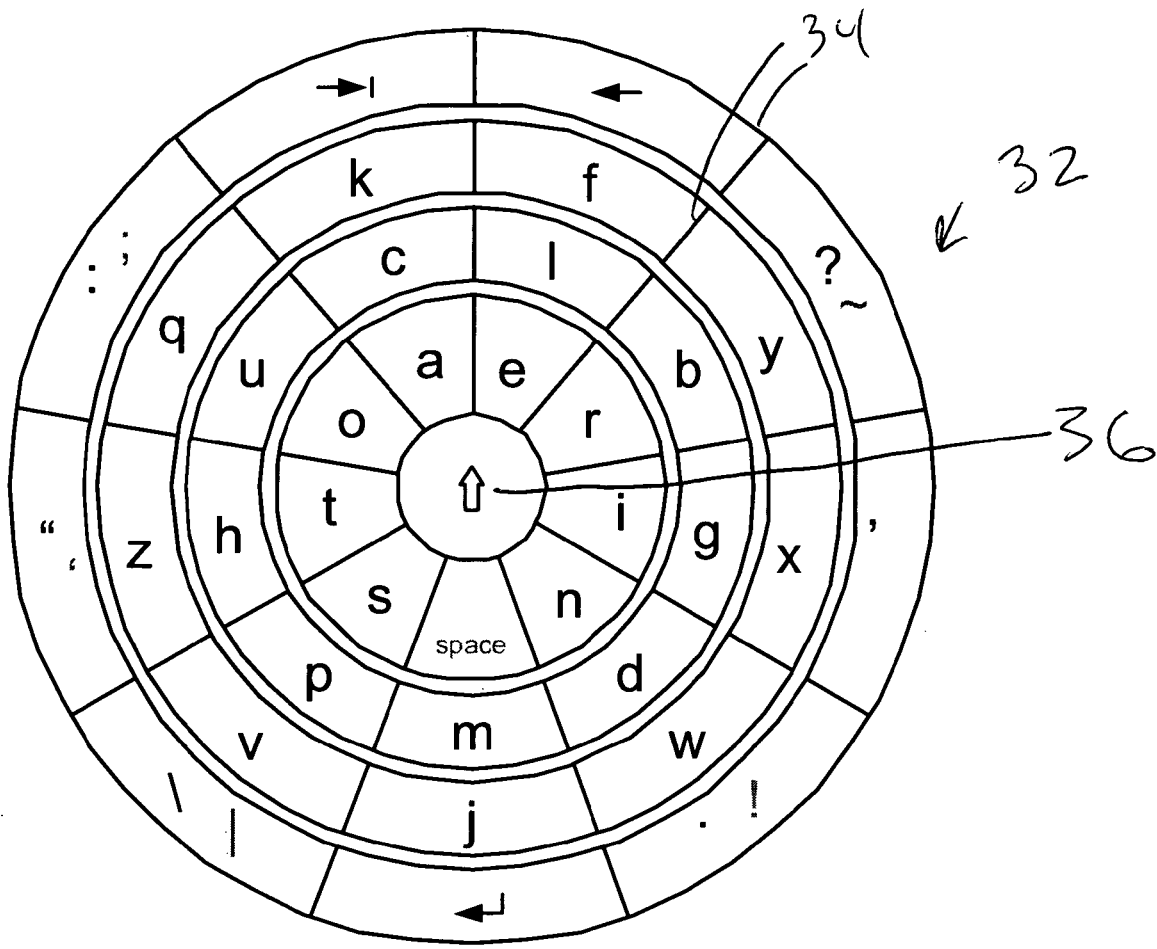

ON SCREEN DISPLAY FOR ALPHA-NUMERIC INPUT

FIELD OF THE INVENTION

The present invention relates generally to on screen displays for alpha-numeric input, particularly to television systems.

BACKGROUND OF THE INVENTION

In modern TV systems, data entry capability can be provided to enable a viewer to, e.g., manipulate the remote control device of the system to input search terms to the TV system processor (which may be within the TV proper and/or within a set-top box) for searching for programs carried on an electronic program guide (EPG). The present invention recognizes that requiring a viewer to manipulate an input device such as a remote control that inherently has limited keys raises the problem of efficiently entering text information into the TV (or other digital electronic device). The present invention further recognizes that in any event, the physical arrangement of keys and symbol assignments on a conventional QWERTY U/I are not arranged for optimal, efficient input when using devices other than the traditional QWERTY keyboard. With these critical recognitions in mind, the invention herein is provided.

SUMMARY OF THE INVENTION

A TV system includes a display, a manipulable remote control device having point-and-click capability, and logic presenting on the display an image of concentric segmented rings that represent symbols such as letters which can be selected based on signals from the remote control device.

In non-limiting implementations a ring can be azimuthally segmented. Preferably, relatively commonly used characters are closest to the center of the concentric rings than letters that are relatively less used. Also, letters in frequently used letter sequences can be assigned to adjacent segments.

The non-limiting remote control device includes a pointing element that is manipulable to position a screen cursor over a segment containing a desired character. Also, the preferred remote control device includes a clicking element that is manipulable to enter a character as data.

In some implementations, the logic presents on the display a grid representing numbers. If desired, selection of a special segment changes the symbols in other segments to symbols of a next hierarchical level.

In another aspect, a method for entering data to a TV system includes presenting, on a display associated with the TV system, an image of concentric segmented rings with segments displaying respective letters. The method includes receiving pointing signals from a remote control device and in response moving a cursor over one of the segments. The method then includes receiving select signals from the remote control device and returning, as input data, the letter shown in the segment over which the cursor is positioned.

In yet another aspect, a graphical user interface (GUI) includes an alpha wheel that is an image of a series of segmented concentric rings the segments of which indicate letters. The alpha wheel is presentable on a display. A remote control point-and-click device operates the alpha wheel.

BRIEF DESCRIPTION OF THE DRAWINGS

The details of the present invention, both as to its structure and operation, can best be understood in reference to the accompanying drawings, in which like reference numerals refer to like parts, and in which:

FIG. 2 is a schematic diagram of the on screen data input display.

DETAILED DESCRIPTION OF THE PREFERRED EMBODIMENTS

Figure 1:
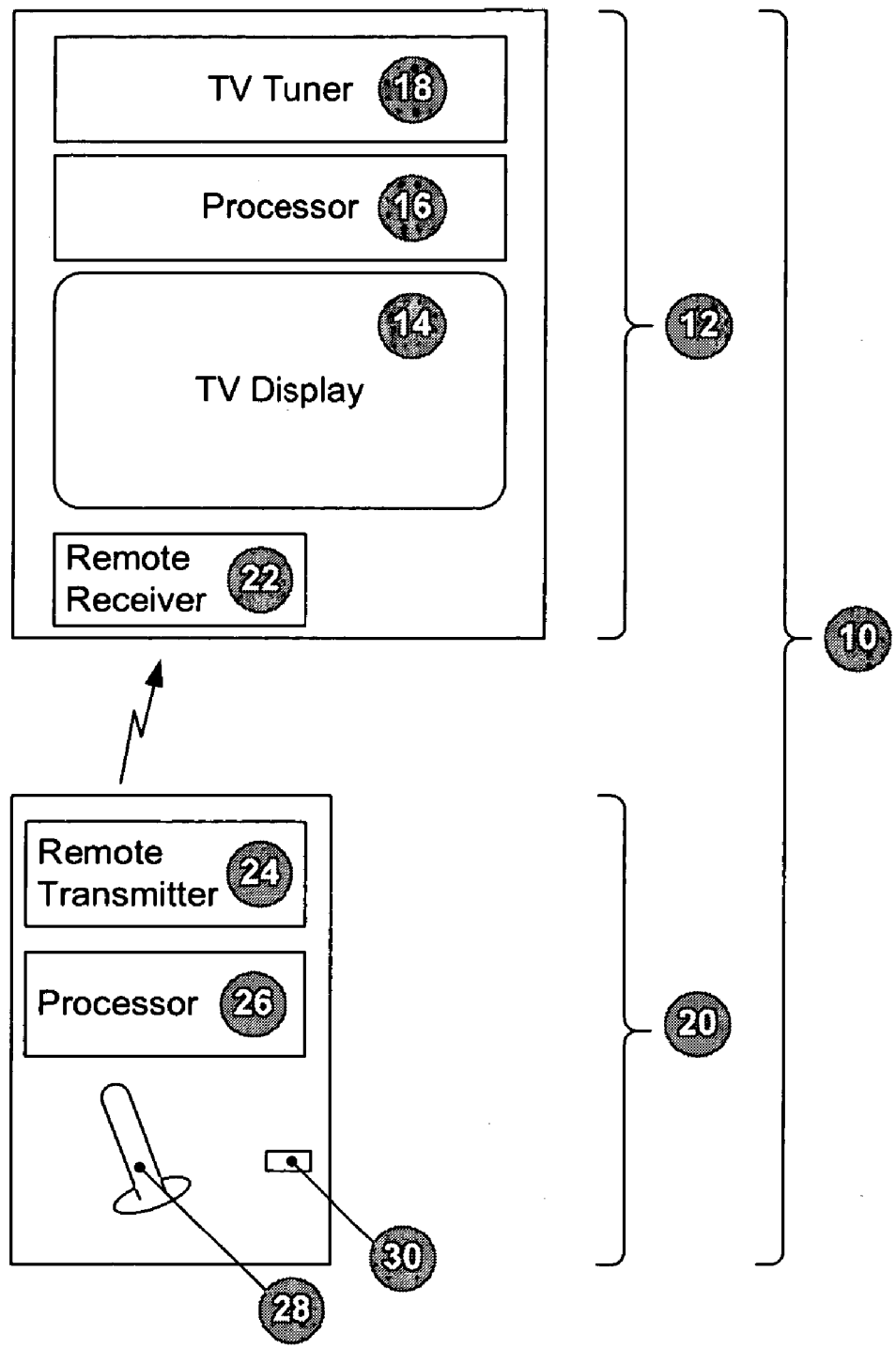
FIG. 1 is a schematic diagram of a non-limiting TV system.

Referring initially to FIG. 1, a system is shown, generally designated 10, which can include a TV 12 that has a video display monitor 14, such as a cathode ray tube or flat panel display, a digital processor 16, and a TV channel tuner 18. Other components known in the art may be included. The processor 16 may be inside the TV housing or it may be part of an external set-top box or other device, e.g., a PVR.

A remote control device 20 can send wireless signals to a remote control receiver 22 on the TV 12 in accordance with TV remote signalling principles known in the art. The remote control device 20 includes a transmitter 24 and a processor 26. Also, the remote control device 20 includes a pointing element 28 such as but not limited to a joystick, trackball, or touchpad and a clicking element 30 such as but not limited to an "enter" button, a touchpad, or other clicking element that, if desired, may be integrated with the pointing element 28. The pointing element 28 alternatively may be a smaller facsimile alpha wheel displayed on a touchscreen of the remote control device 20 with a stylus for character selection.

The processor 16 of the TV 12 displays on the monitor 14 the alpha wheel image discussed further below in reference to FIG. 2 when, for example, a user manipulates the remote control device 20 in a predetermined way to indicate a desire to input data, such as but not limited to text data that represents a search term for a searchable electronic program guide (EPG). The pointing and clicking elements 28, 30 can be manipulated as discussed further below while viewing the alpha wheel to select text for entry. To this end, the processors 16, 26 cooperate according to the discussion below.

Turning now to FIG. 2, a non-limiting example of an alpha wheel that can be presented on the monitor 14 as a GUI is shown, generally designated 32. The alpha wheel 32 is an on-screen display with alphabetic and, if desired, special characters presented within a set of concentric, segmented rings 34. Each ring 34 is azimuthally segmented as shown, e.g., each ring 34 may have nine segments, although the number of segments is not limiting.

Preferably, the arrangement of the letters assigned to these segments is such that the most commonly used characters (e.g., the letter "e") are closest to the center hub of the wheel. Letters (e.g., the letter "q") with lower, historically established, frequency of use can be assigned to segments towards the outer ring of the wheel. Moreover, in preferred non-limiting implementations letters in frequently used letter sequences are assigned to segments close to each other to minimize the average distance to travel between letters when entering words. Which letters are frequently used and which letter sequences frequently occur can be determined using, e.g., publicly available historical information.

The wheel navigation mechanism is the pointing element 28 shown in FIG. 1. The pointing element 28 is manipulated to place a screen cursor over a segment containing a desired character, and then the clicking element 30 is manipulated to enter that character as data to the TV processor 16. A segment may be highlighted when the cursor is positioned over it.

To minimize the number of segments necessary to support the alphabet and special characters, certain characters might be entered by a second "click" or selection on the same wheel segment. The "caps lock" function can be enabled by a second click of the clicking element 30 or by selection on a shift key located at the wheel hub 36. To complete the set of keys necessary for numeric entry, a grid 38 for numbers and additional special characters can be presented below the alpha wheel 32 as shown. The grid 38 can coexist in space adjacent to the alpha wheel or it can be toggled into view in place of the alpha wheel.

In addition to the TV application discussed above, the present invention may also be used as a PDA touchscreen, and for name entry for video games or any other application where inputting symbols or strings of symbols is necessary.

Furthermore, in addition to improving entry of information that can be represented in a single level hierarchy, the invention can be extended to more complicated sets of symbols that require multiple levels of hierarchy. For instance, the selection of certain segments can cause the present symbol set being displayed to change and present the symbols of the next hierarchical level.

While the particular ON SCREEN DISPLAY FOR ALPHA-NUMERIC INPUT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

What is claimed is:

1. A system comprising:
   at least one display;
   at least one manipulable remote control device having at least point-and-click capability; and
   logic presenting on the display an image of at least first and second concentric rings, each ring including respective plural letters that are not arranged in strings establishing words, no letter in the first ring appearing in the second ring, the logic receiving signals from the remote control device for selecting individual letters, wherein first and second letters determined by historical data to be used together frequently in letter sequences are assigned to respective segments adjacent to each other to minimize the average distance to travel between letters when entering words, wherein the first ring is within the second ring and relatively commonly used characters are in the first ring closest to the center of the concentric rings than letters that are relatively less used are in the second ring.

2. The system of claim 1, wherein a ring is azimuthally segmented by visible straight lines, one and only one letter appearing in each segment.

3. The system of claim 1, wherein the remote control device includes a pointing element manipulable to position a screen cursor over a segment containing a desired character.

4. The system of claim 3, wherein the remote control device includes a clicking element manipulable to enter a character as data.

5. The system of claim 1, wherein the logic presents on the display a rectilinear grid representing numbers.

6. The system of claim 1, wherein selection of at least one symbol changes the symbol to a symbol of a next hierarchical level.

7. A method for entering data to a TV system, comprising:
   presenting, on a display associated with the TV system, an image of concentric rings, at least some of the rings being segmented, at least some segments displaying respective letters;
   receiving at least one pointing signal from a remote control device;
   in response to the pointing signal, moving a cursor over one of the segments;
   receiving at least one select signal from the remote control device; and
   returning, as input data, the letter shown in the segment over which the cursor is positioned, wherein relatively commonly used letters are in at least a first ring that is closer to the center of the concentric rings than at least a second ring containing letters that are relatively less used, wherein the first ring is within the second ring and relatively commonly used characters are in the first ring closest to the center of the concentric rings than letters that are relatively less used are in the second ring; and
   presenting on the display concurrently with the image of concentric rings a rectilinear grid representing numbers.

8. The method of claim 7, wherein a ring is azimuthally segmented.

9. The method of claim 7, wherein letters in frequently used letter sequences are assigned to adjacent segments.

10. The method of claim 7, wherein selection of at least one segment changes at least one symbol in at least one segment to a symbol of a next hierarchical level.

11. A graphical user interface (GUI) comprising:
    an alpha wheel, the alpha wheel being an image of a plural concentric rings at least some parts of each of which indicate letters that are not arranged in word patterns, some letters being closer to the center of the rings than other letters, the alpha wheel being presentable on a display; and
    a remote control point-and-click device for operating the alpha wheel, wherein letters in frequently used letter sequences are assigned to adjacent parts and further comprising a rectilinear grid representing numbers presented concurrently with the alpha wheel, first and second letters determined by historical data to be used together frequently in used letter sequences being assigned to respective segments adjacent to each other to minimize the average distance to travel between letters when entering words, wherein a first ring of letters is within a second ring of letters and relatively commonly used characters are in the first ring closest to the center of the concentric rings than letters that are relatively less used are in the second ring.

12. The GUI of claim 11, wherein a ring is azimuthally segmented.

13. The GUI of claim 11, wherein selection of at least one segment changes at least one symbol in at least one segment to a symbol of a next hierarchical level.

* * * * *